United States Patent [19]

Mann et al.

[11] Patent Number: 4,691,801

[45] Date of Patent: Sep. 8, 1987

[54] VEHICLE PROTECTION DEVICE

[76] Inventors: Yale Mann, 1135 Rydal Rd., Rydal, Pa. 19046; Pekka Sarssi, Heteniitantie 5 B 10, 00960 Helsinki 96, Finland

[21] Appl. No.: 835,465

[22] Filed: Mar. 3, 1986

[51] Int. Cl.⁴ ............................................. B60R 25/10
[52] U.S. Cl. ................................ 180/287; 307/10 AT; 340/63
[58] Field of Search .................... 180/287; 307/10 AT; 340/63

[56] References Cited

U.S. PATENT DOCUMENTS 4,223,298 9/1980 Bernier ................................ 180/287
4,300,057 11/1981 Crosas ................................. 180/287
4,371,052 2/1983 Brandt ................................. 180/287

Primary Examiner—Richard A. Bertsch
Attorney, Agent, or Firm—Benasutti and Murray

[57] ABSTRACT

An anti-theft system for vehicles, such as trucks, which is operated by a self-contained hand held transmitter. The system is enabled by activating the vehicle's parking brake system. The transmitter transmits a predetermined signal that activates/deactivates any one of a plurality of manually selected security systems only after the anti-theft system verifies the predetermined signal. Typical security systems lock the parking brake system or interrupt the fuel supply of the vehicle.

4 Claims, 4 Drawing Figures

VEHICLE PROTECTION DEVICE

BACKGROUND OF THE INVENTION

This invention relates to theft prevention apparatus and more particularly to apparatus for preventing unauthorized use of unattended vehicles such as trucks.

A common problem in the trucking industry is the theft of unattended vehicles. The economic consequences of this problem are very serious in view of the high cost of trucks, the large value of the cargo being carried, and the tremendous expense to insure both the truck and it's cargo from theft.

Attempts to safeguard trucks have typically focused on improving ignition locks and locking systems used to limit access to the truck cab. Duplicate or master keys, however, are available and are sometimes utilized to steal trucks. Locksmiths and truck repair shops often maintain collections of such keys to gain access to trucks for legitimate purposes, such as when a driver loses his key and is locked out of the truck. Even without a key a truck engine can be easily started by someone with only minimal knowledge of truck ignition systems by bypassing the ignition lock. Additionally, in cold weather truck motors must often be left running even when the truck is parked; consequently, they provide both tempting and easy targets for thieves who can gain access to a locked cab with a key, by forcing open the door by simply breaking one of the windows.

Due to the ease with which trucks can be stolen despite ignition and door locks, many truck stops employ attendants who watch the parked trucks. However, this solution has also not been satisfactory. First, only large truck stops can afford to hire attendants. Secondly, an attendant cannot verify that every truck is being driven by an authorized party in a busy truck stop where trucks are constantly entering and leaving. Finally, even if enough attendants could be hired to check every driver, the expense and resultant delays would probably be unacceptable.

The problem with the various attempts to prevent truck theft discussed above coupled with the extent of such theft today makes it clear that existing solutions to this problem are far from being satisfactory or successful.

SUMMARY OF THE INVENTION

It is accordingly an object of the present invention to provide an anti-theft system that can prevent unauthorized use of a vehicle.

It is another object of the present invention to provide an anti-theft system that can prevent the release of the parking brake of a parked vehicle to prevent unauthorized use thereof.

It is a further object of the present invention to provide an anti-theft system that can selectively interrupt fuel flow of a parked vehicle to prevent unauthorized use thereof.

It is still another object of the present invention to provide an anti-theft device that can control multiple anti-theft mechanisms to prevent unauthorized use of a parked vehicle.

It is yet a further object of the present invention to provide an anti-theft device that can control a vehicle alarm system to signal any attempt at unauthorized use of a parked vehicle.

It is an additional object of the present invention to provide an anti-theft system that can selectively operate a plurality of anti-theft mechanisms individually or simultaneously at the direction of the vehicle driver.

It is still a further object of the present invention to provide an anti-theft system that is operated by a remote control device.

The present invention overcomes disadvantages and limitations of existing methods of truck theft prevention. In contrast to existing approaches, the present invention enables the driver to lock the parking brake in the engaged state so that even if the tuck can be started, the locked parking brake will prevent it from being driven. Additionally, when the truck is parked without the engine running, the fuel supply can be interrupted so that even if the thief had an ignition key the engine would not run.

The invention does not use a conventional key to lock the parking break and fuel system so a traditional duplicate or master key cannot be obtained. Instead, a portable infrared transmitter is used by the driver to lock and unlock the parking brake and fuel interruption systems. This transmitter employs a unique coded signal which is verified by a master control unit before it responds to any signals so it is almost impossible for an unauthorized user to steal a truck protected by the invention. Finally, this invention also provides maximum safety for the driver because it can only be operated when the parking brake has been manually place in the engaged position by the driver.

In general, the invention features, in one aspect, a vehicle anti-theft device having a source to generate an activating/deactivating signal, apparatus for detecting and decoding this signal, and locking systems which are activated and deactivated in response to this decoded signal, which systems are operable only after engagement of the vehicle's parking brake system.

In another aspect the invention features a vehicle anti-theft device having a source of modulated infrared radiation, apparatus for detecting and demodulating the modulated radiation, and locking systems which are activated and deactivated in response to this demodulated signal, which systems are operable only after engagement of the vehicle's parking brake system.

In preferred embodiments, the modulated infrared radiation is provided by a transmitter having a memory containing an enciphered identification code, means for reading the enciphered identification code and applying it to a modulator which modulates the light output of an infrared emitter in accordance with the information contained in the indentification code. The apparatus for detecting the infrared radiation output of the emitter is a light sensitive device which provides an output signal in accordance with an incident light signal. The apparatus for demodulating the detected infrared radiation is a demodulator which converts the output signal from the light sensitive device to a digital code signal.

The apparatus for demodulating the radiation also includes apparatus for comparing the digital code signal with an identification code stored in a memory and only activating or deactivating the locking systems whenever the digital code signal is identical to the identification code. The apparatus for detecting and demodulating the infrared radiation also includes a selector panel with a plurality of switches for selectively activating or deactivating any one of a plurality of locking systems for a vehicle. The locking systems can prevent unauthorized vehicle use by locking the parking brakes of the vehicle and/or by interrupting the vehicle fuel line. The memory for the transmitter in the apparatus for detecting and demodulating the infrared radiation can be a programmable read only memory, an erasable programmable read only memory, or a read only memory.

In another aspect the invention features a vehicle anti-theft device having a portable, battery operated infrared light transmitter, which includes a manual switch for selectively activating emission of a predetermined stream of light pulses, a control unit which includes a light sensitive device receiving the stream of light pulses, a demodulator for converting the stream of light pulses to a digital data stream, a microprocessor which compares the digital data stream to a digital identification code stored in a programmable read only memory, and which activates or deactivates apparatus for locking the vehicle only when the digital data stream is identical to the digital identification code.

In preferred embodiments, the apparatus for locking the vehicle to prevent unauthorized use includes a valve for preventing repressurization of the pneumatic parking brake system of a truck thereby preventing release of an engaged parking brake system. The vehicle locking apparatus also includes a fuel line valve for interrupting delivery of fuel to the truck. The valves are preferably bi-stable valves capable of remaining in one of two stable states without being continuously energized. In addition, the system automatically prevents activation of any locking devices whenever the vehicle parking brake system is not engaged.

In another aspect, the invention features periodic microprocessor monitoring of the status of the locking systems and providing an alarm.

Other features and advantages of the invention will be apparent from the following detailed description of the preferred embodiment and from the claims.

For a full understanding of the present invention, reference should now be made to the following description and to the accompanying drawings.

DETAILED DESCRIPTION OF THE PREFERRED EMBODIMENT

Figure 1:
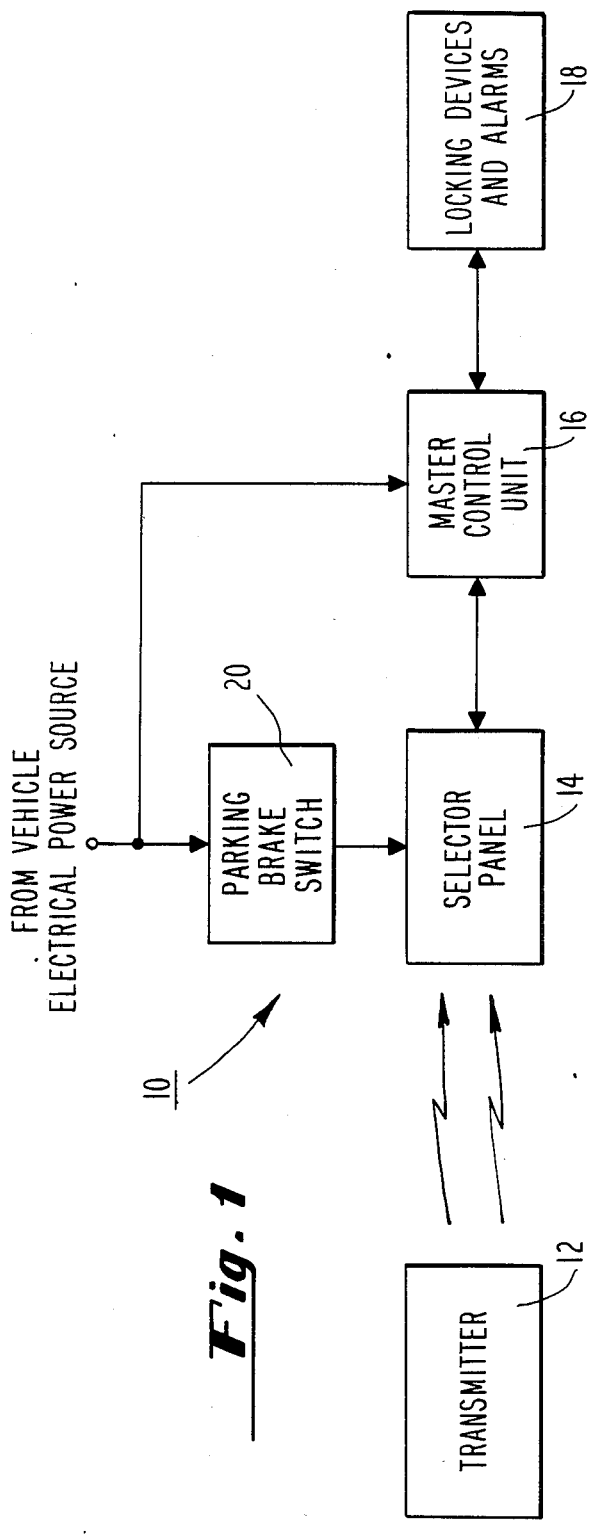
FIG. 1 is a block diagram of a preferred embodiment of the vehicle protection device of the present invention.

Referring to FIG. 1, there is shown a block diagram of a preferred embodiment of the vehicle protection device, generally designated 10. The vehicle protection device 10 comprises a transmitter 12, a selector panel 14, a master control unit 16, and various locking devices and alarms, collectively designated 18. The selector panel 14 receives power from the vehicle electrical system through a switch which is closed as a result of activating the vehicle parking brake system. Consequently, the selector panel 14 is powered only when the vehicle parking brake system is engaged. The master control unit 16 receives power directly from the main electrical power source (usually a storage battery) through appropriate fault interruption means such as a fuse or circuit breaker. Consequently, the master control unit 16 continues to receive electrical power regardless of the state of the vehicle ignition switch or the state of the parking brake system. The transmitter 12 emits a beam of light which contains digitally modulated identification code information. The selector panel receives, amplifies and demodulates light signal for use by the master control unit in controlling the various locking systems and alarms.

Figure 2:
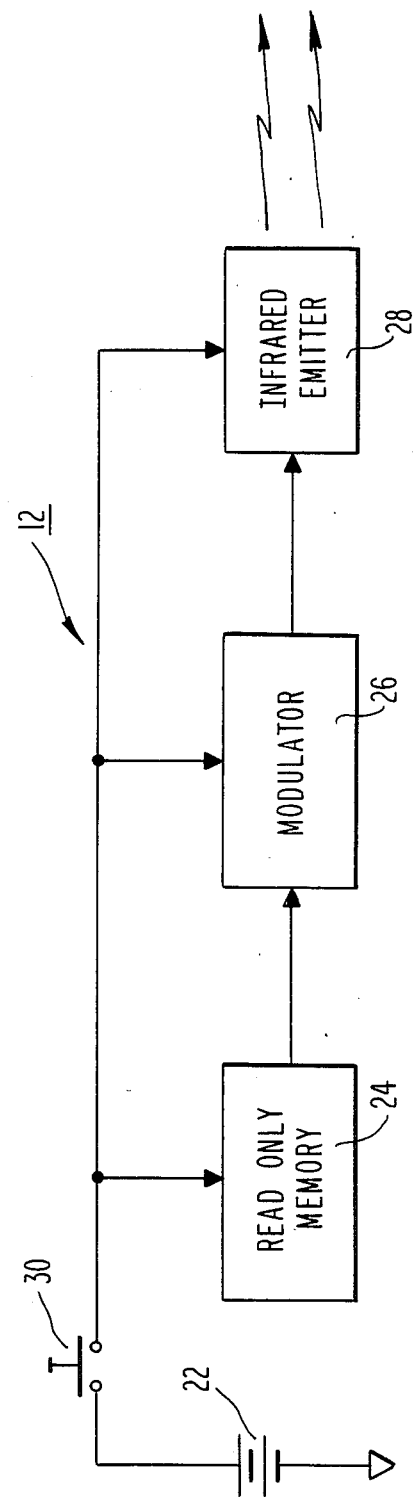
FIG. 2 is a block diagram of a preferred embodiment of the transmitter shown in FIG. 1.

Referring now to FIG. 2, there is shown a block diagram of a preferred embodiment of the transmitter 12. The transmitter 12 comprises a battery 22 which provides electrical power to a read only memory 24, a modulator 26 and an infrared emitter 28 through a push button switch 30. The read only memory 24 stores an enciphered identification code. In the preferred embodiment, the read only memory 24 is a Type 6301 bi-polar programmable read only memory made by Harris or other semiconductor manufacturers. When the switch 30 is depressed, the enciphered identification code is read from the read only memory 24 and applied to the modulator 26. The modulator 26 then modulates the infrared emitter 28 by switching the power to the emitter 28 on and off. This produces a serial pulse train of emitted infrared radiation. This serial pulse train comprises an infrared signal which has been digitally modulated in accordance with the contents stored in the read only memory 24.

Figure 3:
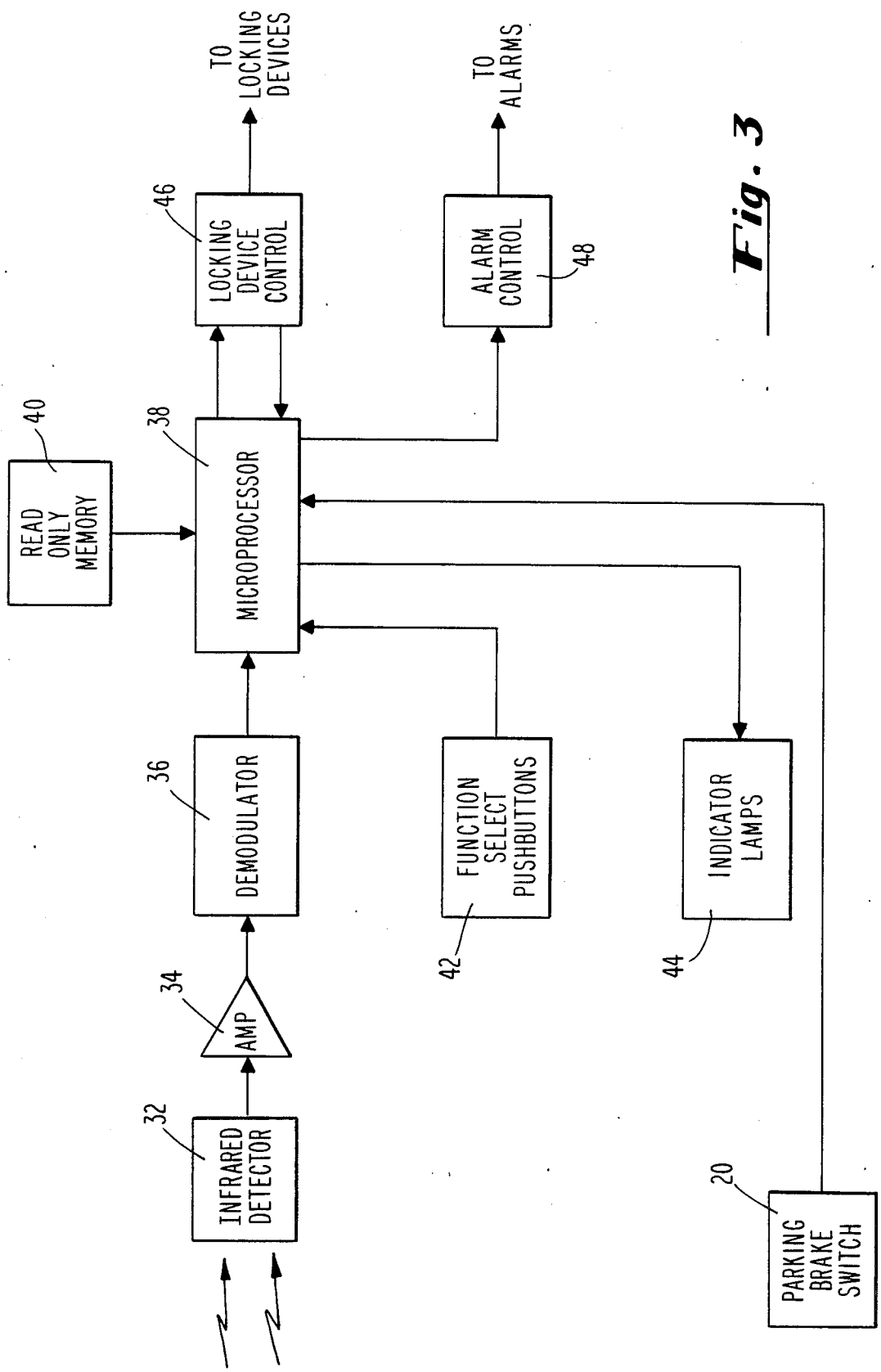
FIG. 3 is a block diagram of a preferred embodiment of the control panel and control unit shown in FIG. 1.

Referring now to FIG. 3, there is shown a block diagram of the selector panel 14 and master control unit 16 depicted in FIG. 1. An infrared detector 32 is disposed in the selector panel 14. The infrared detector 32 is a device which produces an electrical output upon receipt of infrared radiation. Since the infrared radiation which the detector 32 receives from the transmitter 12 is a serial pulse train which is a function of the code stored in read only memory 24, the output of the infrared detector 32 is a signal comprising a serial pulse train having the same information content.

The output of the infrared detector 32 is coupled to the input of an amplifier 34. The output of amplifier 34 is coupled to the input of a demodulator 36. The output of demodulator 36, which is a signal representative of the code stored in the read only memory 24 of the transmitter 12, is coupled to a microprocessor 38. In the preferred embodiment, the microprocessor 38 is a Motorola Type 6805. A second read only memory 40, is coupled to the microprocessor 38. The second read only memory 40 is used to store an identification code.

A plurality of function select push buttons, collectively referred to as 42, is coupled to the microprocessor 38. In the preferred embodiment, there are four function select push buttons. A pluraltiy of indicator lamps, collectively referred to as 44, are controlled by the microprocessor 38. In the preferred embodiment, there are six indicator lamps, the function of which will be described hereinafter.

A locking device control means, preferably comprising a plurality of relays and collectively referred as 46, are connected to the microprocessor 38 through a set of corresponding switching transistors (not shown). The locking device relays control the operation of associated locking devices. In the preferred embodiment, these locking devices comprise electrically operated bi-stable valves, one of which selectively prevents repressurization of the pneumatic parking brake system of the vehicle which another selectively interrupts fuel flow to the engine, as will be subsequently described. Alarm control means, comprising at least one relay and collectively referred to as 48, are connected to the microprocessor 38. The alarm control means controls audio and/or visual alarm devices such as the vehicle's horn or lights (not shown) as will be subsequently described.

Figure 4:
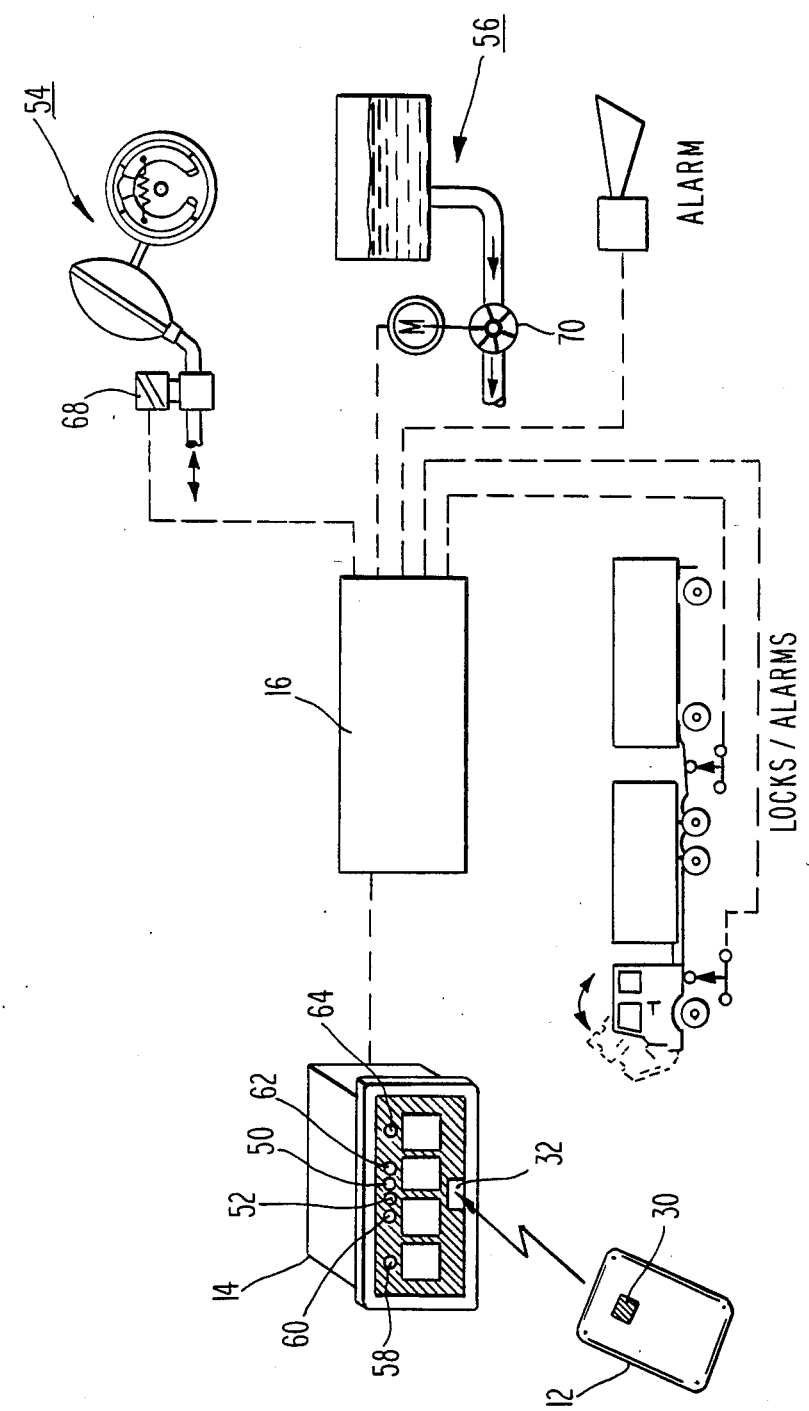
FIG. 4 is a diagrammatic view of a preferred embodiment of the present invention utilized in a truck.

Referring now to FIG. 4, the selector panel 14 is preferably mounted on the truck dashboard so a driver can easily observe and operate the panel. Indicator lamps 50 and 52, preferably light emitting diodes, indicate whether anti-theft locking devices installed in the vehicle, such as parking brake locking system 54 and fuel supply interruption system 55 have been selected for use. Light 50 is preferably a red light emitting diode which will only be on when at least one of the locking devices selected for use is in an active or locked state. Light 52 is preferably a green light emitting diode which will only be on when all locking devices are in their passive or unlocked state.

Push buttons numbered 1 to 4 on control panel 14 are conventional push-button on/off switches which are used by the driver to select which locking devices are to be used. Push button 1, whose on/off status is indicated by light emitting diode 50 being on/off respectively, is used to select whether parking brake locking system 54 is to be utilized. Push button 2, whose on/off status is indicated by light emitting diode 60 being on/off respectively, is used to select whether fuel supply interruption system 56 is to be utilized. Push buttons 3 and 4, and corresponding indicator lights 62 and 64, can be left unconnected or used to engage other locking or alarm systems.

Parking brake locking system 54 and fuel interruption system 56 can only be operated when the truck is not in motion and the driver has manually activated the parking brake system by engaging the parking brake lever (not shown). When the parking brake system is not engaged (off), air pressure is applied to brakes 66 causing them to release. When the parking brake is engaged, a parking brake valve (not shown) bleeds off the air pressure. This causes brakes 66 to be in their engaged positions; consequently, the truck cannot be moved as long as the paking brake is engaged. Engagement of the parking brake lever operates the parking brake switch 20 which activates a parking brake indicator lamp (not shown) to notify the driver that the parking brake is engaged. The selector panel 14 is connected to the parking brake switch 20 so that the selector panel 14 receives operating power only when the parking brake is engaged. As a result, the selector panel 14 can effect the activation of the brake locking system 54 and the fuel interruption system 56 only when the parking brake is engaged.

When the parking brake is engaged, brake locking system 54, under the control of the selector panel 14 and control unit 16, can be activated by closing a valve 68. Closing of the valve 68 prevents repressurization of the parking brake lines therefore preventing release of the parking brakes. Consequently, the truck cannot be moved until valve 68 is opened. Fuel interruption system 56, also under the control of the selector panel 14 and the control unit 16, when activated closes valve 70 which interrupts fuel flow to the truck's engine. Consequently, the motor will not run until valve 70 is opened. Valves 68 and 70 are preferably bi-stable, electrically operated valves which remain in their present state without being continuously energized. In the preferred embodiment, valve 68 is a type V5RAM 63870 and valve 70 is a type V5RAM 61020, both manufactured by Honeywell, Skinner Valve Division, New Britain, Conn.

The operation of the invention will now be described with reference to FIGS. 1-3. After engaging the parking brake system, the truck driver can select which locking mechanism he wishes to use by pushing the appropriate buttons on control panel 14. This allows the driver to select both the parking brake and fuel locking systems for maximum protection by pressing, for example, buttons 1 and 2 on control panel 14. Alternatively, the driver can choose any one of these two locking systems when appropriate. For example, during cold weather it is often desirable to leave the motor running even when parked, so the driver can select only the parking brake locking system by pushing button 1 to the on position and permitting button 2 to remain in the off position.

Once the truck is parked with the parking brake engaged and appropriate locking systems have been selected using control panel 14, the system is ready for activation. The operator then holds transmitter 11 in front of control panel 14 and depresses switch 30 which activates the transmitter. Infrared light pulses are then transmitted to detector 32 for processing by control unit 16. The infrared light pulses received by the detector 32 are then demodulated and converted to a digital signal which corresponds to the enciphered identification code stored in the read only memory 24 of the transmitter 12. In the preferred embodiment, the identification code comprising 32 bits which permits the use of over 4 billion unique identification codes.

After establishing synchronization with the received digital signal, the microprocessor compares the received code with the identification code stored in the second memory 40 and determines if there is a match. A match indicates that the correct code has been received. After a predetermined number of correct codes have been received, the microprocessor will cause each locking mechanism selected in the control panel 14 to change from its existing state to its opposite state. This means that if the selected locking mechanisms are unlocked, they will be changed to a locked state, and if locked to an unlocked state.

It should be noted that, in addition to changing the information contained in the enciphered 32 bit identification code, the security provided by the device 10 of the present invention can be enhanced by varying, from device to device, the timing of the code signal; the frequency of the infrared radiation; and the number of successive correct codes which must be detected by the microprocessor. For example, if the infrared detector 32 is responsive to an IR frequency of 940 nanometers, a transmitter having an infrared emitter 28 which emits a signal at a different frequency could not effect the release of the selected locking devices even though the read only memory 24 of the transmitter contained the correct identification code. Similarly, by varying the timing of the code signal, a transmitter 12 could only communicate with a microprocessor 38 which is operating at the same bit rate as the transmitter.

It should be further noted that, since the master control unit 16 is constantly powered by the truck's battery, regardless of the state of the ignition system and parking brake system as previously stated, the microprocessor 38 can periodically perform monitoring functions such as monitoring the state of the parking brake switch 20. As a result, the microprocessor 38 will first determine that the parking brake switch 20 is closed prior to causing the locking mechanisms to change state. This feature further ensures that the system will not operate unless the parking brake system of the vehicle has been engaged.

In alternate embodiments, the system can be used to control up to four functions. Referring to FIG. 4, functions 1 and 2 could be brake and fuel locking mechanisms 54 and 56 respectively, and functions 3 and 4 could be a door locking system and a trailor disconnect alarm system. The additional functions would be selectable by pressing buttons 3 and 4 on control panel 14 and observing the status of corresponding light emitting diodes 62 and 64.

There is thus been shown and described novel apparatus for preventing the theft of a vehicle which fulfills all of the objects and advantages sought therefore. Many changes, modifications, variations, and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

I claim:

1. A vehicle anti-theft device for a truck having a parking brake system, said device comprising:

(a) locking means for preventing operation of said truck;
   (b) a portable, battery operated infrared light transmitter comprising a manual switch for selectively activating emission of a; predetermined stream of light pulses and
   (c) a control unit, operable only after engagement of said parking brake system, said control unit comprising an infrared detector for receiving said stream of light pulses, a demodulator for converting said stream of light pulses to a digital data stream, and a microprocessor which compares said digital data stream to a digital identification code stored in a read only memory, said microprocessor enabling activation/deactivation of said locking means for preventing operation of said truck whenever said digital data stream is identical to said digital identification code.

2. The vehicle anti-theft device of claim 1, wherein said locking means comprises a valve for controlling pressurization of air brake lines of said truck.

3. The vehicle anti-theft device of claim 1, wherein said locking means comprises a fuel line valve for interrupting delivery of fuel to said truck.

4. The vehicle anti-theft device of claims 2 or 3, wherein said valve is a bi-stable valve, capable of remaining in its present state without being continuously energized.

* * * * *

UNITED STATES PATENT AND TRADEMARK OFFICE
CERTIFICATE OF CORRECTION

PATENT NO. : 4,691,801

DATED : September 8, 1987

INVENTOR(S) : Yale Mann and Pekka Sarssi

It is certified that error appears in the above-identified patent and that said Letters Patent is hereby corrected as shown below:

Column 1, line 29, after "door" insert --or--.

Column 2, line 10, change "tuck" to --truck--.

Column 2, line 27, change "place" to --placed--.

Column 4, line 51, change "pluraltiy" to --plurality--.

Column 5, line 42, change "paking" to --parking--.

Column 6, line 11, change "ony" to --only--.

Claim 1, line 7, delete ";".

Claim 1, line 8, insert --;-- after "pulses".

Signed and Sealed this

Fifth Day of January, 1988

*Attest:*

DONALD J. QUIGG

*Attesting Officer*      *Commissioner of Patents and Trademarks*